United States Patent [19]

Suzuki et al.

[11] Patent Number: 4,949,702
[45] Date of Patent: Aug. 21, 1990

[54] SELF-HEATING CONTAINER

[75] Inventors: Ryoichi Suzuki, Yokohama; Mitsuo Maiya, Tokyo; Motoo Kuwahara, Kamaishi; Kunio Yamauchi, Hikone; Choji Kawabata, Tatebayashi; Akira Takeuchi, Fukaya; Koki Ando, Tokyo, all of Japan

[73] Assignee: Nissin Shokuhin Kabushiki Kaisha, Osaka, Japan

[21] Appl. No.: 392,422

[22] Filed: Aug. 11, 1989

[30] Foreign Application Priority Data

Aug. 12, 1988 [JP] Japan .................. 63-200041
Aug. 12, 1988 [JP] Japan .................. 63-200042
Jun. 28, 1989 [JP] Japan .................. 1-74838[U]

[51] Int. Cl.$^5$ ............................. F24J 1/00
[52] U.S. Cl. ................................ 126/263
[58] Field of Search ........................ 126/263

[56] References Cited

U.S. PATENT DOCUMENTS

| 2,384,278 | 9/1945 | Calduell ............. 126/263 |
| 4,640,264 | 2/1987 | Yamaguchi et al. ..... 126/263 |
| 4,809,673 | 3/1989 | Charvin . |
| 4,819,612 | 4/1989 | Okamoto et al. ....... 126/263 |

FOREIGN PATENT DOCUMENTS

| 894859 | 2/1983 | Belgium . |
| 1192803 | 11/1982 | Canada . |
| 0130757 | 1/1985 | European Pat. Off. . |
| 0244837 | 5/1987 | European Pat. Off. . |
| 0274973 | 12/1987 | European Pat. Off. . |
| 52-19358 | 2/1977 | Japan . |
| 61-89332 | 6/1986 | Japan . |
| 62-93654 | 6/1987 | Japan . |
| 62-146427 | 9/1987 | Japan . |
| 63-42089 | 3/1988 | Japan . |
| 433580 | 8/1935 | United Kingdom . |
| 572573 | 10/1945 | United Kingdom . |

*Primary Examiner*—Carroll B. Dority
*Attorney, Agent, or Firm*—Marshall, O'Toole, Gerstein, Murray & Bicknell

[57] ABSTRACT

A self-heating container comprising a heater contained in a container. The heater includes a pyrogen of high energy density having a large heating value, and a firing agent contacting the pyrogen and easier to fire than the pyrogen. Each of the pyrogen and the firing agents is a mixture of one or more kinds of metal oxide powder and one or more kinds of powder of elementary substances or alloys of metal and semimetal. The heater is supported on a wall of the container through a heat insulator to reduce the heat loss. The insulator has a bore formed through it and extending between the firing agent and the outside of the container. An igniter can be inserted into the bore to ignite the firing agent.

14 Claims, 4 Drawing Sheets

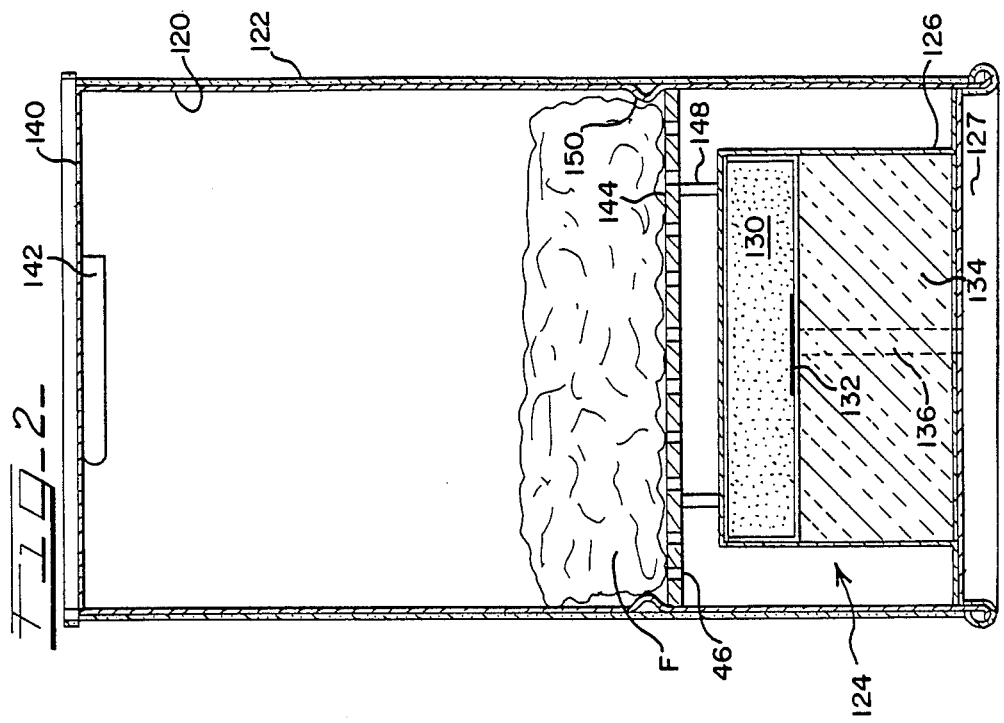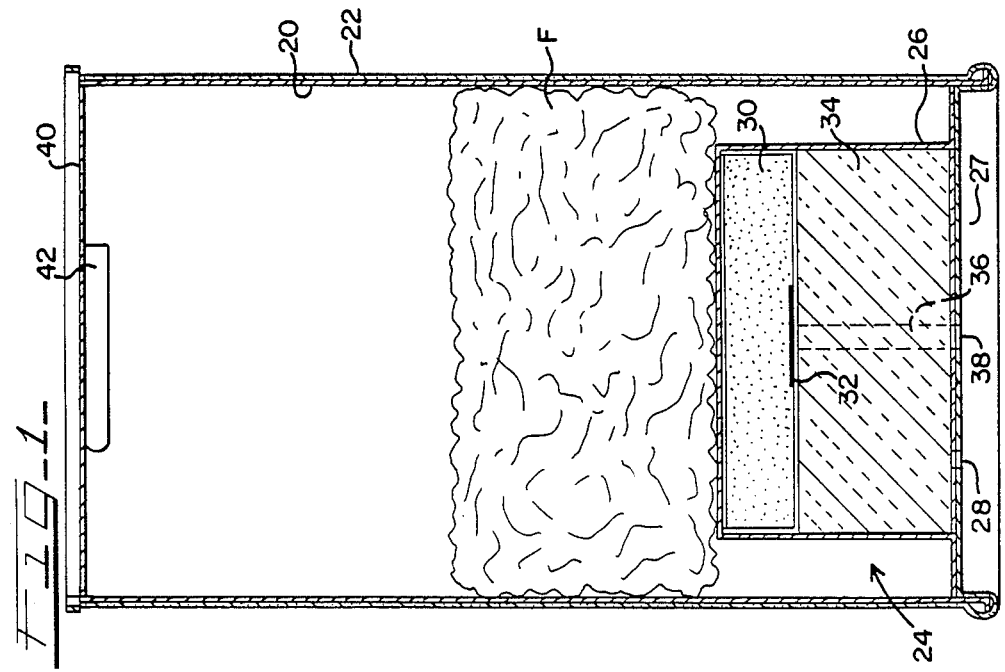

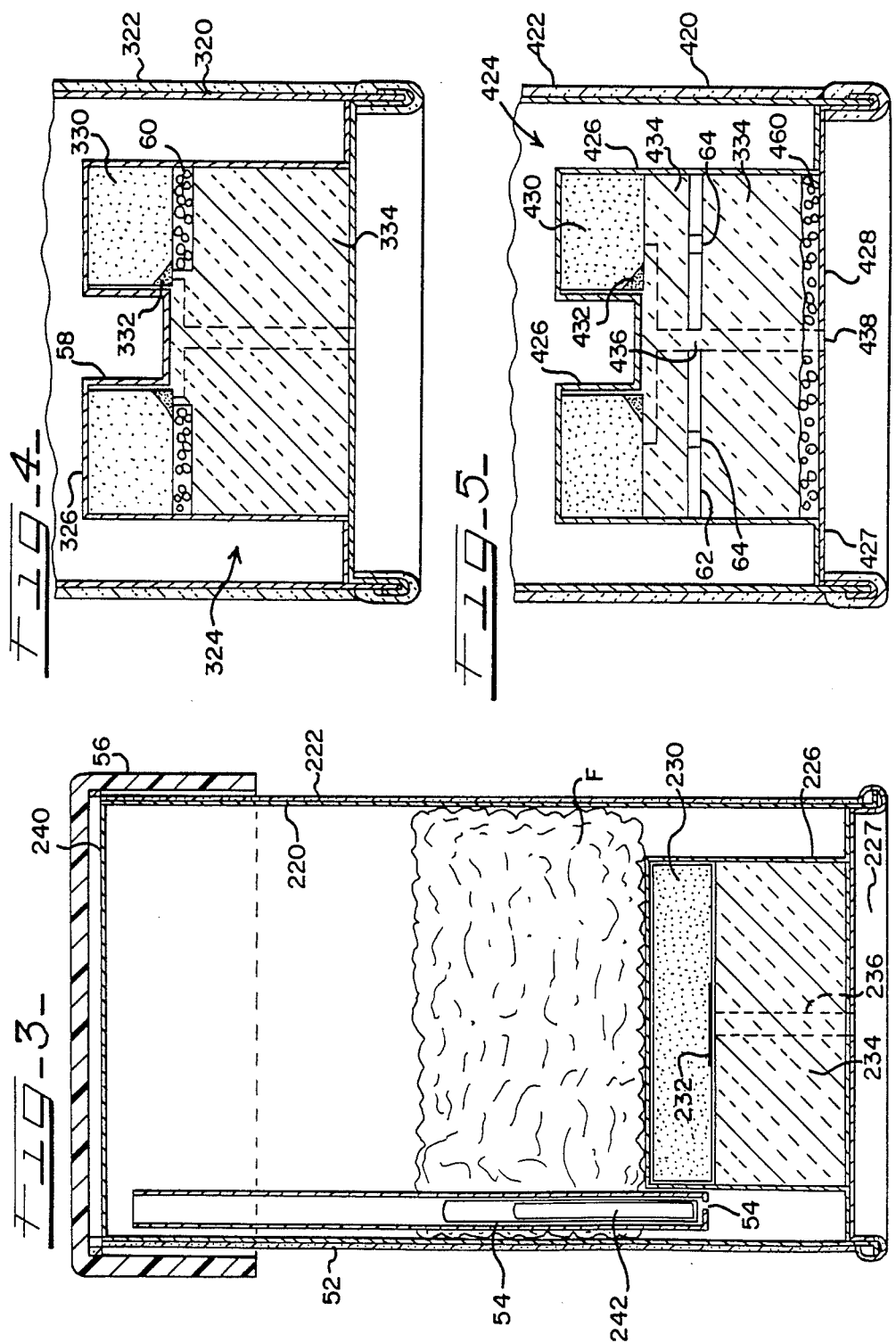

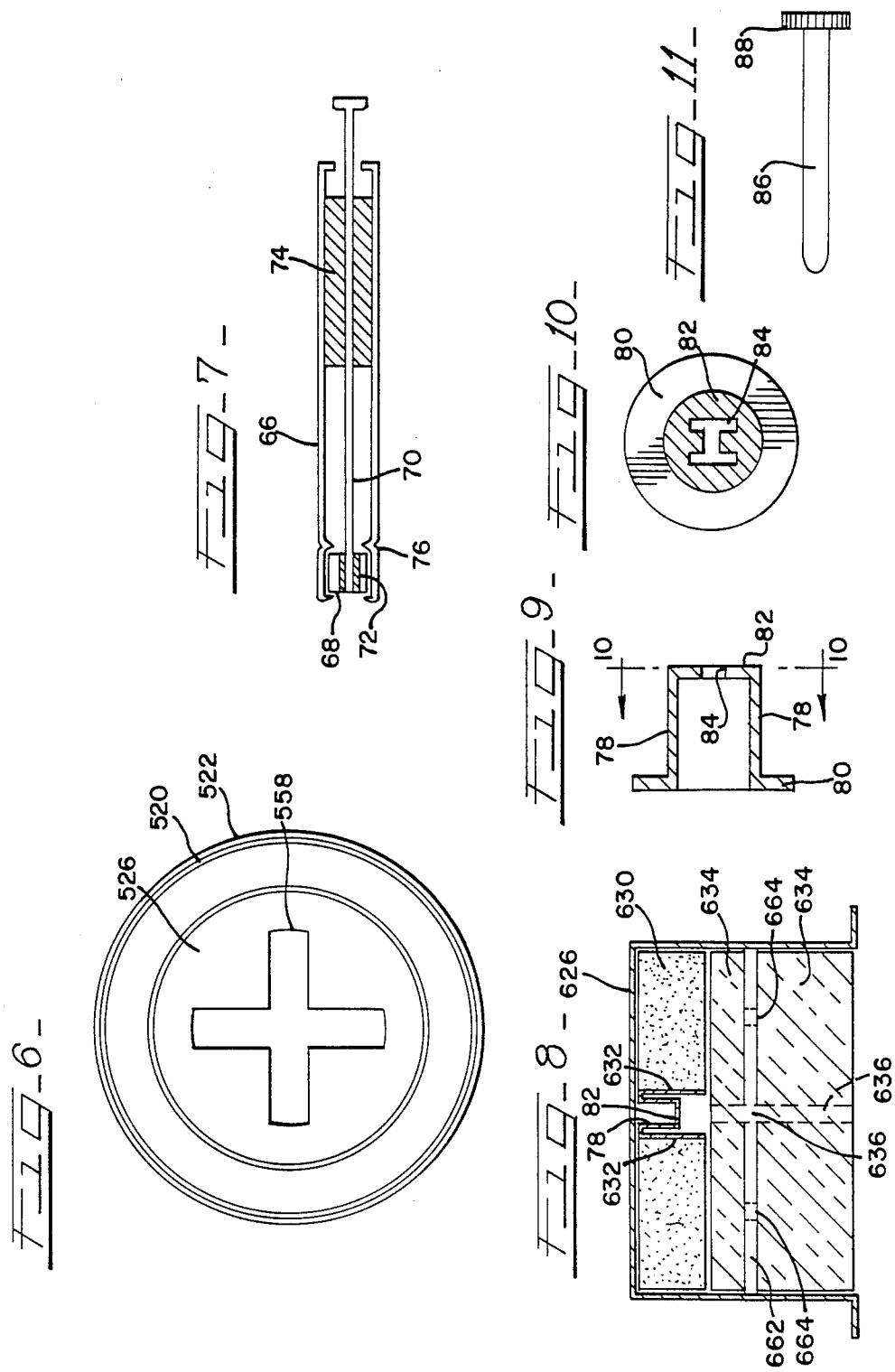

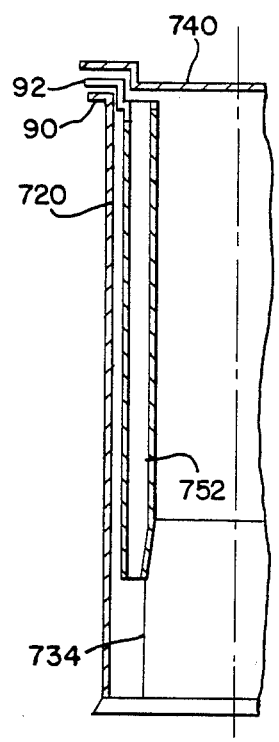
FIG_12_
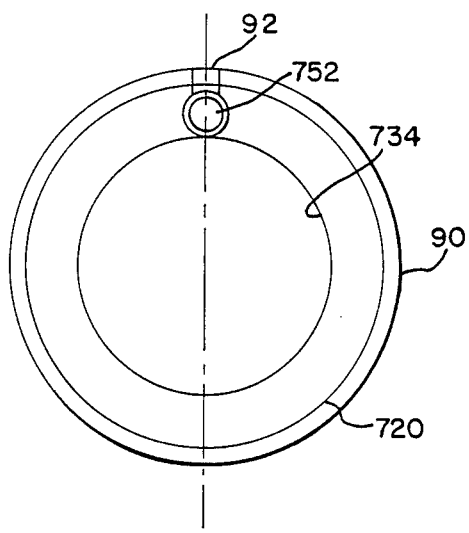
FIG_13_
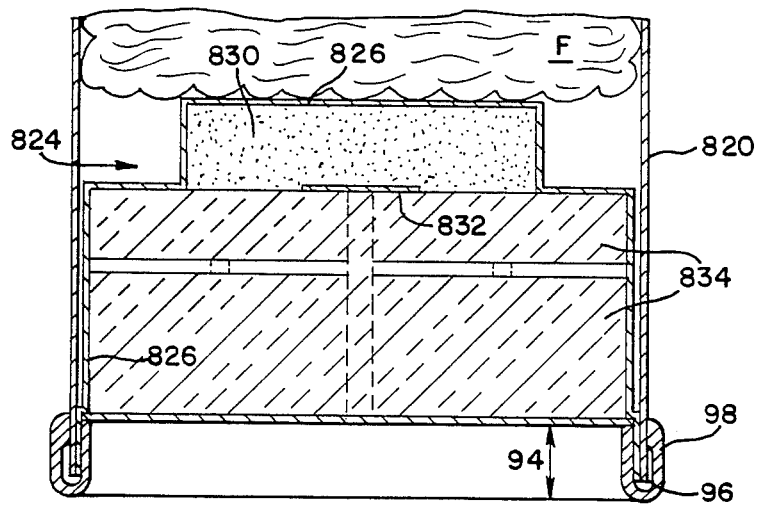
FIG_14_

SELF-HEATING CONTAINER

FIELD AND BACKGROUND OF THE INVENTION

This invention relates to a self-heating container, which incorporates a heater.

Self-heating containers are known in the prior art, which do not use gas or electricity as a heat source. Instead, heat is generated by hydration reaction of calcium oxide, calcium chloride, aluminum or the like, as exemplified by Japanese Utility Model Provisional Publications Nos. 60-70235, 61-89332 and 62-93654. This hydration reaction has a slow heating speed, and generates a very small amount of heat relative to the volume of pyrogen.

Other conventional self-heating containers include heat generation by a self-burning reaction of a pyrogen comprising an oxide and metal powder, as exemplified by Japanese Patent Provisional Publication No. 52-19358 and Japanese Utility Model Provisional Publications Nos. 62-146427 and 63-42089. The ignition of the pyrogen requires heating for awhile by an electric heater, a lighter or a fuse. This is inconvenient because the electric heater and the fuse require a battery and a match or a lighter, respectively.

Although the pyrogen for a self-burning reaction has the advantage of high energy density, a fire, a burn or other accidents may occur if the pyrogen is not properly used. An example is that a container for use with water in it may be heated by this reaction inadvertently without water.

It is a general object of this invention to provide a portable self-heating container, which can be easily ignited and quickly heated, without a possibility of improper operation.

It is another object of the invention to provide a self-heating food container having suitable and safe firing means for different types of food. Some foods such as quick-cooking noodles may be heated in water, and other foods such as curry and stew may be heated directly.

It is a further object of the invention to provide an improved self-heating food container which is convenient for cooking and eating.

It is a further object of the invention to provide a self-heating container having a heater with an improved ability to fire, generate heat, remove gas and smoke, and heat the contents in the container.

SUMMARY OF THE INVENTION

A self-heating container according to the invention comprises a heater contained in a container. The heater includes a pyrogen of high energy density having a large heating value, and a firing agent contacting the pyrogen and easier to fire than the pyrogen.

Each of the pyrogen and the firing agents is a mixture of one or more kinds of metal oxide powder and one or more kinds of powder of elementary substances or alloys of metal and semimetal.

The heater is supported on a wall of the container through a heat insulator to reduce the heat loss. The insulator has a bore formed through it and extending between the firing agent and the outside of the container. An igniter can be inserted into the bore to ignite the firing agent.

BRIEF DESCRIPTION OF THE DRAWINGS

Preferred embodiments of the invention are shown in the accompanying figures of the drawings, wherein:

FIGS. 1–3 are vertical cross sections of three embodiments of self-heating food containers;

FIGS. 4 and 5 are fragmentary views in vertical cross section of still additional embodiments of self-heating food containers;

FIG. 6 is a plan of another embodiment of a heater casing;

FIG. 7 is a longitudinal cross section of an igniter for use with the container shown in FIGS. 1–5;

FIG. 8 is a vertical cross section of a heater;

FIG. 9 is an axial cross section of one of the parts shown in FIG. 8;

FIG. 10 is a radial cross section taken along line 10—10 of FIG. 9;

FIG. 11 is a side view of a flint for use with the heater of FIGS. 8–10;

FIG. 12 is a partial view in vertical cross section of another form of self-heating food container;

FIG. 13 is a top plan of the container of FIG. 12, but with the lid removed; and FIG. 14 is a partial view in vertical cross section of still another form of self-heating container.

DETAILED DESCRIPTION OF THE DRAWINGS

In FIG. 1, the container includes a cylindrical can or metal casing 20 with its outer side surface surrounded by a heat-insulating cover 22 of paper, plastic, cloth, ceramic or the like. The cover 22 reduces the heat radiation from the can 20, and facilitates the handling of the container.

The can 20 contains a heater 24 near the bottom thereof, the heater including a cylindrical inverted cup-shaped casing 26 having an outwardly flanged lower edge which is fixed along with a metal bottom plate 27 to the lower end of the can 20 by turning the edges together. The bottom plate 27 of the can 20 and the casing 26 are formed with aligned gas release holes 28 through them.

The heater casing 26 contains a pyrogen or heating agent 30 at its upper side, a firing agent 32 contacting the bottom center portion of the pyrogen 30, and a heat-insulating and filtering element 34 being provided under the pyrogen.

The pyrogen 30 may be a mixture of one or more metal oxides, such as iron oxide, copper oxide and lead oxide, and one or more elementary substances and alloys of metal and semimetal, such as silicon, titanium and iron, which have a larger amount of heat of formation of oxide than the metals forming the metal oxides. The pyrogen 30 produces a large amount of heat of formation when the metal or semimetal oxidizes by depriving the oxide of oxygen.

The firing agent 32 may be a mixture of one or more elementary substances and alloys of boron, aluminum, calcium and magnesium, and one or more oxidizers such as copper oxide, iron oxide, barium peroxide and strontium peroxide. The firing agent produces a large amount of heat of formation when copper oxide, etc. oxidizes the boron etc.

The firing agent 32 needs a less amount of heat for firing than the pyrogen 30, and is easy to fire by a trace of a spark from an igniter. By arranging the firing agent 32 in contact with the pyrogen 30, the heat from the firing agent directly fires the pyrogen. In other words, the incorporation of the firing agent 32 allows the pyrogen 30 to fire easily.

For example, 1 g of a mixture comprising 79.2 wt. % iron oxide and 20.8 wt. % silicon, as the pyrogen, produced about 600 cal of heat. Only 75 grams of this mixture were needed to heat 500 ml of water from 10 to 100 degrees C., and it took only 1 minute.

In this example, the firing agent was 0.5 g of a mixture of a powder of boron (12 wt. %) and, as the oxidizer, iron oxide and a small amount of barium peroxide (88 wt. %). A similar result was obtained when the firing agent was aluminum, a small amount of boron and an oxidizer comprising copper oxide as a major component and barium peroxide in a small amount.

Other examples of the pyrogen which are relatively low in reaction temperature and suitable for this invention are as follows: Iron oxide and ferrosilicon (an alloy of ironsilicon) produced about 500 cal/g; copper oxide and silicon produced about 500 cal/g; lead oxide and silicon produced about 300 cal/g.

The finer the powder which constitutes the pyrogen and the firing agent, the better reactive it is, and the particle size should be less than 200 mesh.

The heater casing 26 may be loaded with the pyrogen and a firing agent in powder form, or in pellet form as pressed at a pressure range of 200–500 kg/cm$^2$. The pellet form is superior to the powder form in heat transfer and faster in temperature rise.

The heater 24 generates heat by reaction based on the movement of oxygen between metal and oxide, and produces little smoke or harmful gas. The igniter 42 may, however, produce a very small amount of such gas upon ignition.

The insulator and filter 34 may be comprised of particles, fibers or a pressed product of alumina, silica, magnesia or carbon functioning as both a heat insulator and a smoke/gas filter, in order to facilitate the production and lower the costs. For example, the insulator 34 may be comprised of ceramic fibers, silica board comprising $SiO_2$ and CaO as major components, rock wool or glass wool. The insulator 34 also may include an upper layer of ceramic which is highly heat-resisting, and a lower layer of rock wool or glass wool which is less heat-resisting and inexpensive.

The insulator 34 is formed with an axial bore 36 through it. The top end of bore 36 opens at the firing agent 32, and the bottom end opens out of the can 20 through aligned holes 38 formed in the bottom walls of the can 20 and the casing 26. The holes 38 should be closed air-tightly by aluminum foil or plastic film (not shown) to keep the heater 24 from absorbing moisture from the air. The foil or film can be removed at the time of ignition.

The can 20 has a top lid 40, which supports an igniter 42 on its interior surface with an adhesive tape or an adhesive. The igniter 42 will be explained in detail later.

The can 20 is loaded with a quick-cooking food F, such as dehydrated noodles, positioned on top of the heater 24. The process of cooking the food F includes the steps of opening the lid 40, pouring water into the can 20 around the food F, detaching the igniter 42 from the lid 40, inserting the igniter 42 through the bottom holes 38 into the bore 36, and igniting the firing agent 32.

Thus, this process requires the step of opening the lid before ignition. The opening step can remind the consumer to pour water into the can before ignition. This is advantageous for dehydrated foods such as quick-cooking noodles and rice and soup, which require water for cooking.

For curry, stew, etc. which require no water, the container may be constructed to set the igniter 42 in the bore 36 of insulator 34 in advance after the heater 24 is assembled before shipping.

In FIG. 2, the container is similar to that of FIG. 1, but there is also provided a porous disc 144 for supporting a quantity of food F such as steamed bread. The disc 144 has a number of small holes 146 in it and legs 148, and may be made of metal (aluminum or tin), plastic or ceramic (alumina, magnesia or silica).

The can 120 is formed with an inner bead 150 in its interior side wall. The disc 144 is mounted by inserting it on a heater 124 into the can 120 under the bead 150, and then securing the heater along with the can bottom 127 to the can side wall by turning the edges together.

At the time of use, water is placed in the can 120 to a level which is below the disc 144 in order to steam the food. With reference to FIG. 3, the can 220 includes a vertical tubular support 52 for a floatable plastic case 54 containing an igniter 242. The support 52 is fixed in the can 220 and has an open top and a bottom hole 55. A multi-purpose plastic cover/dish 56 is normally placed over the lid 240.

The process of cooking a food F such as a dehydrated food includes the steps of removing the cover/dish 56, opening the lid 240, pouring water into the can 220 so that the igniter case 54 floats, picking up the case 54, placing the cover/dish 56 over the can 220 again to reduce the heat loss and the spewing of boiling water, taking the igniter 242 out of the case 54, inserting the igniter 242 into the bore 236, and igniting the firing agent 232.

This process prevents ignition before pouring water into the can. The reduction of heat loss is advantageous for quick-cooking noodles, rice, soup, stew, etc., the palatability of which increases with the temperature. The hot food can be eaten conveniently using the dish 56.

The igniter case 54 may be adapted to be connected through a string with a float (not shown), which float can be picked up along with the case 54 when water is poured into the can 220.

In FIG. 4 is shown a different form of heater 324 which includes a casing 326 having a cylindrical top recess 58, which is surrounded by annular pyrogen 330 and firing agent 332 within the casing, to increase the heat transfer area for the food (not shown) placed over the casing 326.

The heater 324 also includes a desiccant 60 such as silica gel and calcium oxide, between the pyrogen 330 and a heat insulator 334 to keep the heater materials dry.

The insulator 334 may have an upper portion adjacent the pyrogen 330 which is more efficient in heat insulation, such as alumina and silica, and a lower portion comprising carbon. This arrangement can absorb and remove the gases and smoke produced particularly from the igniter.

In FIG. 5 which shows still another form of heater, the heater 424 includes a desiccant 460 under a heat insulator 434 at the bottom of the can. The can bottom 427 is formed with gas release holes 428. The insulator 434 is divided by a good heat-conductive metal disc 62 into an upper layer 434a of alumina or silica and a lower layer 434b of carbon fibers. The disc 62 may be made of 1-3 mm thick iron or aluminum, and has gas holes 64 formed through it. The periphery of disc 62 contacts the inner wall of a heater casing 426, and the disc 62 transfers heat from the pyrogen 430 to the casing 426 to restrain the heat transfer to the bottom of the can.

A vertical bore 436 for an igniter (not shown) extends through the insulator 434, one of the holes 64 of the disc 62 and the desiccant 460, and opens into the atmosphere through a hole 438 in the can bottom 427.

FIG. 6 shows a modified heater casing 526 of a heater which may be similar to the heater 324 or the heater 424 except that the casing 526 has a crossed top recess 558 instead of a cylindrical recess 58 or 426.

In FIG. 7, an igniter is shown which includes an outer thin pipe 66 of aluminum or iron and which contains a short tube 68 of paper or plastic fixed to it. A pin or cord 70 of metal, wood, paper or cloth extends through the pipe 66, and at one end into the tube 68. The tube 68 and the pin 70 sandwich a mixture 72 of one or more combustibles such as red phosphorus, sulfur, arsenic sulfide and phosphorus sulfide, and an oxide such as potassium chlorate, potassium perchlorate and potassium nitrate.

The outer pipe 66 also contains a heat insulator 74 which protects against leakage of heat to outside. The pipe 66 is formed with an inner peripheral bead 76 for stronger sparking in one direction.

To produce ignition, the pin 70 is pulled or pushed to produce friction heat between the igniting agent 72 and the tube 68, ignite the igniting agent 72 and then cause sparks to be emitted from the front end of the outer pipe 66.

In FIGS. 8-10, the heater includes a casing 626 containing a pyrogen 630, which has a vertical center hole formed through it. To the peripheral wall of this hole is integrally fixed a firing agent 632 by pressing. A cylindrical support 78 of iron has an outer top flange 80 fixed between the casing 626 and the pyrogen 630. To the open bottom end of support 78 is fixed a hard steel plate 82 formed with a small H-shaped opening 84 through it.

Shown in FIG. 11 is a flint bar 86 which is circular in radial cross section (about 2 mm in diameter) and has a knurled head 88. The flint 86 may be composed of about 85 wt. % mixture of rare earth metals, and the remainder may include iron and a very small amount of magnesium.

The flint 86 is normally supported for initial storage or packaging within the food container (not shown) and is removed for ignition. To produce ignition, the flint 86 is taken out of the container, inserted through the passage 636 and into the H-shaped opening 84 and rubbed against it to produce a spark which, in turn, fires the firing agent 632.

In FIGS. 12 and 13 is shown a container which includes a can 720 made of metal, resin or paper and has an outer top flange 90. A cylindrical igniter support 752 may be made of plastic, aluminum, tin or an edible material composed mainly of flour. The support 752 has an outer top flange 92 which can be captured between a lid 740 and the flange 90. The flange 90 may be formed with a recess (not shown) to facilitate positioning and mounting the flange 92. The support 752, of course, contains an igniter (not shown) generally similar to the arrangement shown in FIG. 3.

In FIG. 14, the container includes a can 820 having a deep bottom countersink 94. The can 820 is not covered by a heat insulator, but has a calked bottom end 96 covered by a heat insulator 98, which may be made of the same material as that of insulator 22 in FIG. 1, for example. The bottom insulator 98 insulates heat flow from the can 820 to a table, on which the can be be placed. This construction, of course, improves the safety of use of the container.

The can 820 contains a heater 824 enclosed in a metal casing 826. The casing 826 encases an insulator/filter 834 having a diameter slightly smaller than the can 820, and a pyrogen 830 placed on the top side of the insulator/filter and having a diameter substantially smaller than the insulator/filter.

The minimized space between the cylindrical walls of the casing 626 and the can 820 can prevent the food F from falling into the space. This helps the consumer pick up all the food from the container during consumption.

Example 1

Container: As shown in FIG. 1 (84 mm in diameter and 150 mm high) and covered by a heat insulator of nonwoven fabric which was about 0.5 mm thick. An igniter as shown in FIG. 7 was fixed to the interior side of the lid by an adhesive tape.

Food Composition: 65 g of quick-cooking noodles, 10 g of soup and ingredients, and 310 ml of water.

Pyrogen: A mixture of 56 g of iron oxide (Fe O) powder and 24 g of ferro-silicon (80 wt. % of silicon, 20 wt. % of iron) powder.

Firing agent: 0.5 g of mixed powder of 12 wt % of boron and 88 wt. % of iron oxide and a little barium peroxide.

Insulator/filter: An approximately 5 mm thick upper layer of silica and alumina fibers, and approximately 19 mm thick middle layer of glass wool, and an approximately 1 mm thick lower layer of carbon fibers.

Igniter: Contains a mixture of red phosphorus and potassium chlorate.

The operation included the steps of opening the lid, removing the igniter and inserting it through the bore of the insulator/filter, pouring the water into the container, and pushing the igniter needle to ignite the firing agent and the pyrogen.

As a result, the food and the water were heated to a temperature of 100 degrees C. in about 2.5 minutes. The noodles were restored to an edible condition better than the conventional quick-cooking noodles cooked by mixing them with previously heated water at 100 degrees C.

EXAMPLE 2

Container: As shown in FIG. 2 and covered by a heat insulator made of paper.

Food composition: 100 g of rice soaked in water for about 1 hour in advance and 100 ml of water.

Pyrogen: A mixture of 80 g of iron oxide powder and 21 g of silicon powder.

Firing agent, insulator/filter and igniter: Same as in Example 1.

The operation included the steps of opening the lid, removing the igniter, placing the soaked rice and water in the can, closing the lid, inserting the igniter into the bore in the insulator/filter, and pulling the igniter needle to ignite the firing agent and the pyrogen.

As a result, the rice was cooked in 15 minutes.

Example 3

Container: As shown in FIG. 3 and covered by a 0.5 mm thick plastic heat insulator.

Food composition: 65 g of quick-cooking noodles, 10 g of soup and ingredients, and 310 ml of water.

Heater: As shown in FIG. 8 and containing a desiccant as shown in FIG. 4.

Pyrogen: 56 g of iron oxide powder and 24 g of mixed powder of ferro-silicon (75 wt. % of silicon, 20 wt. % of iron).

Firing agent: 0.5 g of mixed powder of 12 wt. % of boron and 88 wt. % of iron oxide and a little barium peroxide.

Insulator/filter: An approximately 10 mm thick upper layer of alumina and an approximately 15 mm thick lower layer of rock wool.

Igniter: A hard steel plate and a flint as shown in FIGS. 9–11.

The operation included the steps of removing the cover/dish, opening the lid, pouring the water into the can so that the case containing the flint floats, picking up the case, taking out the flint, putting the cover/dish back over the container, inserting the flint into the bore of the insulator/filter, and igniting the firing agent and the pyrogen.

As a result, the noodles were heated to 100 degrees C. in about 2 minutes. The cover/dish was removed and used as a dish to eat the noodles and drink the soup when they are hot.

Example 4

Container: As shown in FIG. 3 and covered by nonwoven fabric.

Food Composition: 65 g of quick-cooking noodles, 10 g of soup and ingredients, and 310 ml of water.

Heater: As shown in FIG. 4.

Pyrogen: Same as in Example 3.

Firing agent: 0.5 g of mixed powder of aluminum, a little boron, copper oxide as a major component, and a little barium peroxide.

Insulator/filter and igniter: Same as in Example 1.

The operation included the steps of removing the cover/dish, opening the lid, pouring the water into the can, picking up the floating case which contains the igniter, taking out the igniter, putting the cover/dish back over the container, inserting the igniter into the bore of the insulator/filter, and pulling the igniter needle to ignite the firing agent and pyrogen.

As a result, the noodles were heated to 100 degrees C. in about 1.5 minutes. The cover/dish was removed again and used as a dish.

What is claimed is:

1. A self-heating container comprising:
   an inner casing fixed to and inside said container,
   a heater contained in said casing and including a pyrogen and a firing agent in contact with said pyrogen,
   said pyrogen comprising a mixture of at least one kind of metal oxide powder and at least one kind of powder of elementary substance or an alloy of metal and semimetal,
   said firing agent being easier to fire than said pyrogen, and comprising a mixture of at least one kind of metal oxide powder and at least one kind of powder of elementary substance or alloy of metal and semimetal,
   a heat insulator contained in said casing under said pyrogen and insulating said heater from said container,
   said insulator having a bore formed therethrough and extending between said firing agent and the outside of said container, and
   an igniter adapted to generate sparks by friction heat, at least a separate component of said igniter being normally supported by said container away from said heater and being adapted to be inserted into said bore.

2. A self-heating container comprising:
   a casing fixed to said container,
   a heater contained in said casing and including a pyrogen and a firing agent in contact with said pyrogen,
   said pyrogen comprising a mixture of at least one kind of metal oxide powder and at least one kind of powder of elementary substance or an alloy of metal and semimetal,
   said firing agent being easier to fire than said pyrogen, and comprising a mixture of at least one kind of metal oxide powder and at least one kind of powder of elementary substance or alloy of metal and semimetal, and
   a heat insulator contained in said casing under said pyrogen and insulating said heater from said container,
   said insulator having a bore formed therethrough and extending between said firing agent and the outside of said container to receive at least part of an igniter, and said container comprising a cylindrical peripheral wall, wherein said casing is cylindrical and includes an upper portion surrounding said pyrogen and said firing agent and a lower portion surrounding said insulator, said first portion being substantially smaller in diameter than said second portion, said second portion being slightly smaller in diameter than said peripheral wall.

3. A container according to claim 1, wherein said igniter comprises a flint.

4. A container according to claim 1, wherein said igniter comprises a hard member fixed to said inner casing adjacent said firing agent, and a flint bar normally supported away from said heater and adapted to be inserted into said bore and rubbed against said hard member.

5. A container according to claim 1 or 3, and further comprising an outer peripheral wall outside said inner casing, said wall being surrounded by a heat insulator.

6. A container according to claim 1 or 3, and further comprising a top lid and a plastic cover normally placed over said top lid, said cover serving to close the top of said container after said top lid is opened and serving as a tableware after said cover is removed from said top.

7. A container according to claim 1 or 3, and further comprising an inner bead formed in said peripheral wall and a porous plate fixed between said bead and said casing.

8. A container according to claim 1 or 3, and further comprising a desiccant contained in said casing.

9. A container according to claim 1 or 3, wherein said insulator includes a gas and smoke filter.

10. A container according to claim 1 or 3, wherein said casing has a top recess to increase the heat transfer area.

11. A container according to claim 6, wherein at least a separate component of said igniter is supported on the inner side of said lid.

12. A container according to claim 5, and further including a vertical tubular support for supporting at least a separate component of said igniter therein, said support being fixed to the inner side of said peripheral wall and having an open top and a bottom hole.

13. A container according to claim 1 or 3, and further comprising a heat-conductive metal plate in contact with an inner wall of said casing and in said insulator, said metal plate having a hole aligned with said bore and a gas release hole.

14. A container according to claim 1 or 3, and further comprising a deep bottom countersink and a calked bottom covered by a heat insulator.

* * * * *